United States Patent
Butter et al.

(10) Patent No.: US 7,934,046 B2
(45) Date of Patent: Apr. 26, 2011

(54) ACCESS TABLE LOOKUP FOR BUS BRIDGE

(75) Inventors: Adrian S Butter, Binghamton, NY (US); Eric M Foster, Owego, NY (US); Glenn D Gilda, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/166,571

(22) Filed: Jul. 2, 2008

(65) Prior Publication Data

US 2010/0005213 A1 Jan. 7, 2010

(51) Int. Cl.
G06F 13/40 (2006.01)
(52) U.S. Cl. .......................... 710/317; 710/110; 710/309
(58) Field of Classification Search .................... 710/21, 710/26–28, 31, 38, 40, 41, 110, 119, 309, 710/311, 312, 316, 317, 242–244
See application file for complete search history.

(56) References Cited

U.S. PATENT DOCUMENTS

| | | | | |
|---|---|---|---|---|
| 4,490,782 A * | 12/1984 | Dixon et al. | ................ | 711/136 |
| 6,230,241 B1 * | 5/2001 | McKenney | ................ | 711/118 |
| 6,851,056 B2 | 2/2005 | Evans et al. | | |
| 6,981,074 B2 * | 12/2005 | Oner et al. | ................ | 710/32 |
| 7,062,587 B2 * | 6/2006 | Zaidi et al. | ................ | 710/305 |
| 7,089,419 B2 | 8/2006 | Foster et al. | | |
| 7,139,860 B2 * | 11/2006 | Walker et al. | ................ | 710/306 |
| 7,145,903 B2 * | 12/2006 | Gutierrez | ................ | 370/362 |
| 7,240,141 B2 * | 7/2007 | Ning et al. | ................ | 710/309 |
| 7,266,632 B2 * | 9/2007 | Dao et al. | ................ | 710/317 |
| 7,275,119 B2 * | 9/2007 | Clark | ................ | 710/35 |
| 2001/0042147 A1 * | 11/2001 | Adams et al. | ................ | 710/100 |
| 2003/0200451 A1 * | 10/2003 | Evans et al. | ................ | 713/193 |
| 2004/0054837 A1 * | 3/2004 | Biran et al. | ................ | 710/305 |
| 2004/0230709 A1 * | 11/2004 | Moll | ................ | 710/1 |

* cited by examiner

*Primary Examiner* — Khanh Dang
(74) *Attorney, Agent, or Firm* — Toler Law Group (57) ABSTRACT

Cross-bar segment routing and access table address remapping functions are combined within a cross-bar of a system-on-a-chip. In this manner, address remapping may occur prior to segment routing. One or more access table caching registers may be included for each master port. The caching registers may allow for a rapid lookup of one or more access table entries associated with each master, as well as allow for the simultaneous lookup by multiple masters without adding ports to the access table. A segment identifier may be stored in the caching registers to indicate how to route a matching request to the appropriate slave segment.

20 Claims, 6 Drawing Sheets

ACCESS TABLE LOOKUP FOR BUS BRIDGE

FIELD OF THE INVENTION

The present invention relates generally to data request handling and transfer of data within a system-on-a-chip (SOC), and more particularly, to data request handling and transfer within an SOC system.

BACKGROUND OF THE INVENTION

Multiple discrete functions are commonly integrated into an SOC design. Ensuring access to external devices for the various components on the microchip is a consistent design challenge. For example, a relatively large number of SOC processes may require concurrent access to external memory, e.g., dynamic random access memory (DRAM). Designers must consequently employ different routing practices and configurations to ensure effective access to resources.

One conventional approach to enabling resource access consists of dedicating a bus to each on-chip functional component. While effective in ensuring communication channels, this setup does not allow for efficient sharing of data and requires costly data transfers. A more common approach employs a common bus that allows one or more components of the SOC to communicate with external devices through a single port.

While the sharing of resources enabled by the common bus is valued, the practice introduces security concerns regarding controlling access to content or other sensitive data in the SOC. For example, it can be difficult to prevent unauthorized access to protected memory spaces when using a large common memory pool in an SOC. Examples of such memory may include compressed data supplied by a transport demultiplexer to a decoder of a set-top box. For this reason, secure bridges are often incorporated into SOC designs. Additionally, bridges typically provide enhanced system capability by providing a connection between different bus architectures and extending the number of supported bus-attached IP cores. Bridges may also reduce the amount of contention traffic by segmenting data buses.

Bridges may also provide an additional function of performing address relocation or remapping as operations flow through the bridge, as well as checking functions that permit or deny operation completion. An example of such a bridge is one that provides a set of security functions that restrict access to regions in memory based on rights granted by secure boot code.

In a common bus architecture that uses a bridge, a bus master originates requests on a system bus. An arbiter within a bus controller function selects requests that are placed on the bus by masters and routes them to all of the slaves. A slave acknowledges a request if the address supplied with the request falls within the memory region in which the slave resides.

Bus architectures following this protocol may allow for cross-bar implementations where more than one slave segment exists on the bus. A crossbar, also known as a cross-point or matrix switch, may comprise a switch connecting multiple inputs to multiple outputs in a matrix manner. In such a system, master requests are often routed to slave segments based on a subset of address bits that are decoded by the cross-bar. Each segment has its own arbiter and bus controller function that handles requests routed to the segment.

A bridge may be inserted on such a bus between a cross-bar bus controller and the slaves, appearing as a slave to the cross-bar, and as a bus controller to the slaves. The bridge may contain an access table that each request address is checked against. A request coming into the bridge is checked against all of the entries of the access table. Each entry of the access table has an address that is used for matching against incoming request addresses, along with permissions, a remap address and a pointer to other parameters. If an address match is found and access rights are granted, the request continues to pass through the bridge with a new remap address from the matching access table entry.

Despite the advantages of such bridge implementations, inclusion of the bridge can be associated with a performance penalty, e.g., delays. Such implementations may also require additional cross-bar and arbitration capabilities that translate into increased complexity and cost to the bridge design. Bridges can additionally require numerous ports to accommodate slave segments associated with the access table, further increasing costs.

Therefore, what is needed is a way to improve system performance by streamlining routing and minimizing hardware requirements.

SUMMARY OF THE INVENTION

Embodiments of the present invention provide an improved method, apparatus and program product for routing a data request within an SOC design by virtue of receiving a data request at a bridge comprising a caching register, and using the caching register to match the data request to routing information. The routing information may be associated with a tag. The data request may be routed using the routing information.

According to aspects of the invention, the caching register may be updated in response to an access table hit. The data request address may be replaced with a substitute address using the caching register prior to routing the data request. Where so configured, another data request may be concurrently matched to another address using another caching register of the bridge.

Embodiments consistent with the invention may include a cross-bar switch within the bridge. For instance, the caching register may be positioned within a cross-bar switch of the bridge. Embodiments may include an access table positioned within a cross-bar switch of the bridge. In one aspect, an embodiment may use the caching register in place of the access table and cross-bar router to match the data request to routing information associated with a functional slave component.

According to another aspect of the invention, the bridge may include at least one caching register for each port of the bridge. A segment identifier may be stored within the caching register to facilitate the routing. The caching register may store access table data most recently used by a master functional component. An access table lookup may be used to match a data request should there be no match in the caching register.

Embodiments consistent with the invention may cross-bar route only once during data request transmission. Security permissions associated with the data request may be determined, where desired. Other determinations may regard determining a routing segment appropriate for the data request.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the invention may combine cross-bar segment routing and access table address remapping functions within a cross-bar. In this manner, address remapping may occur prior to segment routing. Aspects of the invention may add one or more access table caching registers for each master port. The caching registers may allow for a rapid lookup of one or more access table entries associated with each master, as well as allow for the simultaneous lookup by multiple masters without adding ports to the access table. A segment identifier may be stored in the caching registers to indicate how to route a matching request to the appropriate slave segment.

As such, the need for access table lookup may be minimized by relying on frequently finding the needed information in the access table caching registers, rather than having to search the full access table. These caching registers may store and recall the most recent access table entries used by a master. Bits may be added to these registers to remember slave segment information per entry.

Embodiments may eliminate the need for a second cross-bar request routing function within a bridge. Aspects of the invention may improve system performance by performing cross-bar address routing only once. Features may reduce or eliminate the need for multiple ports into the access table function.

Figure 1:
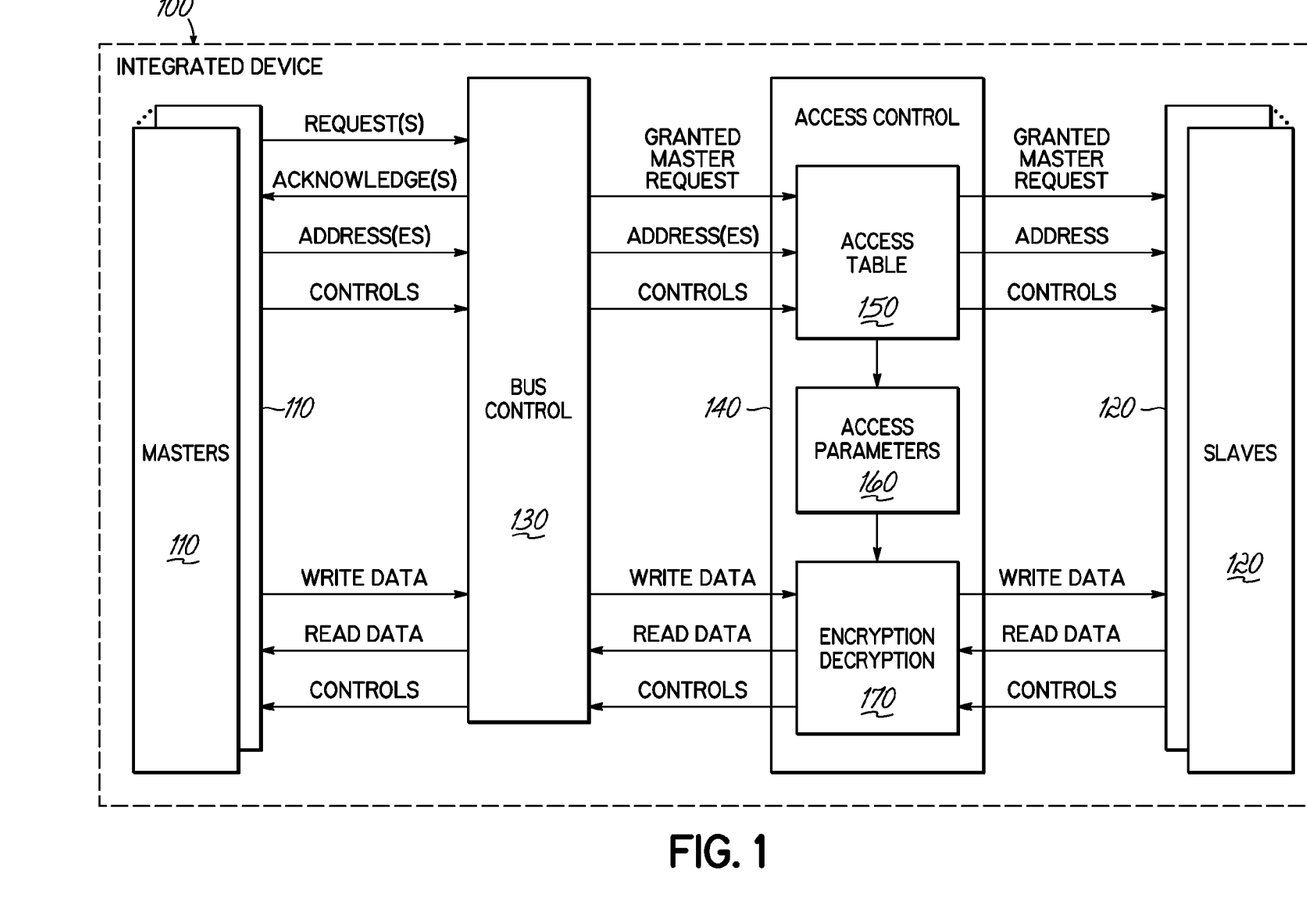
FIG. 1 shows a block diagram of an SOC implementation that includes a secure bridge having an access table.

FIG. 1 shows an example of a system with a bridge inserted between a bus controller slave segment and bus slaves. FIG. 1 more particularly shows an SOC 100 having a plurality of masters 110 in communication with a bus control unit 130. The bus control unit 130 is in communication with an access control unit comprising a bridge 140. The bridge 140 mediates between incoming master requests and requests that are passed on to the slaves 120. The bridge 140 comprises an access table 150, access parameters 160 and an encryption/decryption unit 170. The bridge 140 may communicate with a plurality of slaves 120. FIG. 1 additionally shows brief data descriptions and paths, as are recognizable to those skilled in the art.

Figure 2:
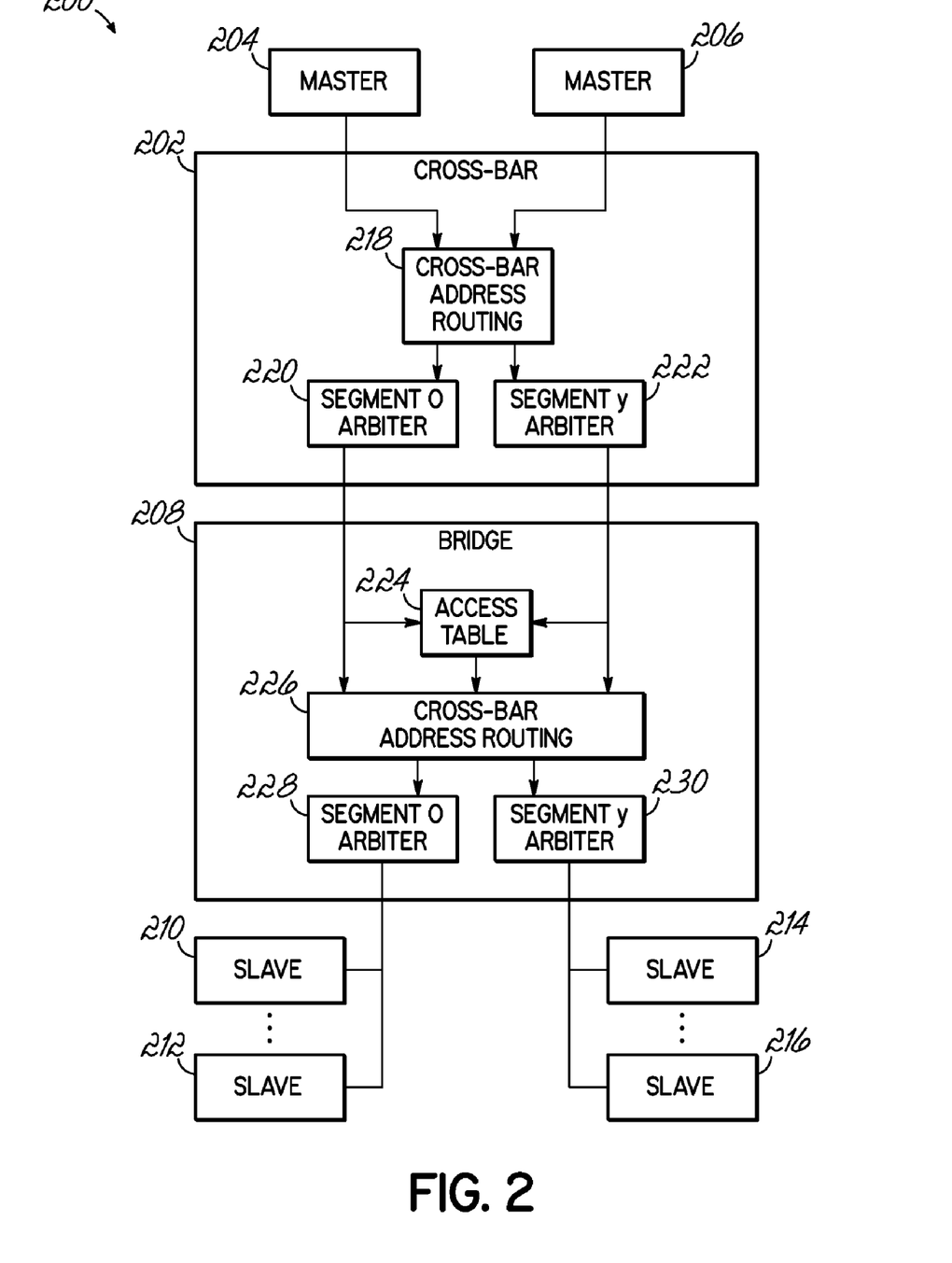
FIG. 2 shows a block diagram of a bridge implementation within an SOC.

FIG. 2 shows an example of a bridge request routing implementation 200 that may have application within the SOC 100 of FIG. 1. Dataflow paths similar to those of FIG. 1 are not shown in order to focus on the limitations of conventional designs. FIG. 2 more particularly shows the major components of an SOC, including a cross-bar 202 that may correspond to the bus control 130 in FIG. 1. Not shown in FIG. 1 is the duplication of interfaces between the bus control 130 and the bridge 140 that is associated with the cross-bar 202 as shown in FIG. 2. The cross-bar 202 connects to masters 204, 206. The implementation 200 includes a secure bridge 208 interfacing to the cross-bar 202 over slave segment request interfaces, and slaves 210, 212 attaching to the secure bridge 208 on one slave segment interface. Slaves 214, 216 attach to the secure bridge 208 on a second slave segment interface. Additional slaves typically connected to the segments are not shown. Not shown in FIG. 1 is the duplication of interfaces between bridge 140 and slaves 120 that is associated with the bridge 208 as shown in FIG. 2.

The cross-bar 202 includes a cross-bar address routing unit 218. The cross-bar address routing unit 218 selectively connects to segment arbiters 220, 222. The bridge 208 includes an access table 224. Bridge 208 additionally includes a cross-bar address routing unit 226. The cross-bar address routing unit 226 may selectively connect to segment arbiters 228, 230.

As previously discussed, the access table 224 within the bridge 208 may produce a remap (also known as substitution address) for an incoming master request. The new remap address may affect the slave segment that the request is targeting. It is possible that the cross-bar 202 may route a request to one slave segment, while the access table function in the bridge 208 may select a remap address that targets another slave segment. As a result, the bridge 208 needs to implement a second cross-bar and arbitration capability at blocks 226, 228 and 230. However, these processes and associated units add complexity and cost to the bridge design.

Additionally, there may be a performance penalty associated with the inclusion of bridge 208 within the SOC. More specifically, the system design as shown in FIG. 2, requires that a particular sequence must be followed when routing master requests to slave devices 210, 212, 214, 216. First, a bus master 204, 206 issues a request that is routed through the cross-bar 202 using a subset of address bits. The request includes an address, a portion of which is used to determine routing to slave segments. The secure bridge 208 receives the request from the cross-bar 202 on one of its input ports, and sends the request to the access table 224 for checking permissions and remapping the address. The cross-bar routing function 226 uses the new remap address to determine the destination slave segment.

In the preferred embodiment, there would ideally be a three cycle request-acknowledge minimum latency between when requests are activated by a master and acknowledged by a slave. The timing of this sequence would include a bus master raising its request in a first cycle. The PLB bus arbiter would pass a chosen request to the slaves during a second cycle. The applicable slave could respond during a third cycle. The necessary inclusion of the secure bridge 208 adds at least a cycle to this minimum latency because the address is not ready to be passed to the slaves 210, 212, 214, 216 in the second cycle. Instead, the address must be looked up in the access table 224 during this cycle. The slave segment determination also must occur during the second cycle. Depending on the implementation, the access table lookup and slave segment determination may take the majority of the PLB clock cycle to perform. The request is not passed on to the target slaves 210, 212, 214, 216 until the third cycle. Only then may the slaves 210, 212, 214, 216 respond to the request during the fourth cycle.

Figure 3:
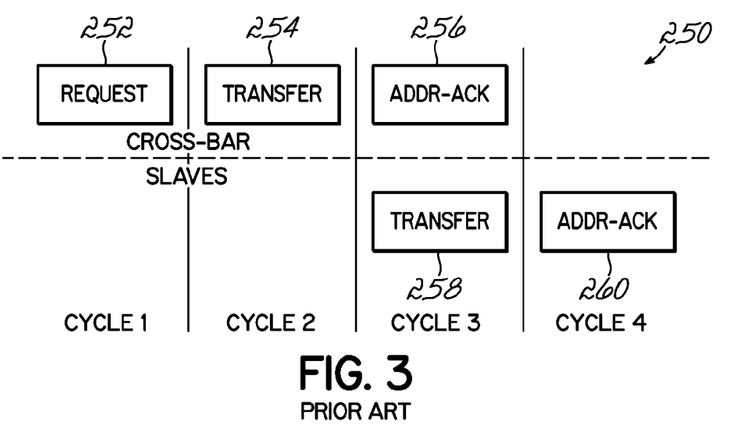
FIG. 3 shows a timing diagram for an SOC implementation.

FIG. 3 graphically shows the timing sequence described above. More particularly, FIG. 3 shows a timing sequence 250 involving the transfer of a data request by the components of an implementation 200. The figure shows timing sequences as viewed respectively by a cross-bar 202 and slaves 210, 212, 214, 216.

The cross-bar 202 may view a request 252 being made during a first cycle. The request 252 may coincide with cross-bar routing and cross-bar arbitration. The transfer 254 of the data request during cycle 2, as seen by the cross-bar 202, may presume that the cross bar arbitration of cycle 1 was won. The transfer 254 may include a lookup at the access table 224 and appropriate routing.

Cycle 3 may include an acknowledgment 256, as seen by the cross bar 202, and a transfer 258 of the data request, as viewed by the slaves 210, 212, 214, 216. Cycle 4 may include an acknowledgement 260 of receiving the request. As illustrated in exemplary sequence 250, the secure bridge 208 delays processing by at least a cycle.

Another problem with some SOC designs regards the number of required ports into the access table 224 within the secure bridge 208. As the number of slave segments increase, the number of ports required for simultaneously searching the access table also increases. A simultaneous search allows two requests to proceed simultaneously to different slave segments. Adding additional ports, however, may increase the size and read time of the access table significantly.

Figure 4:
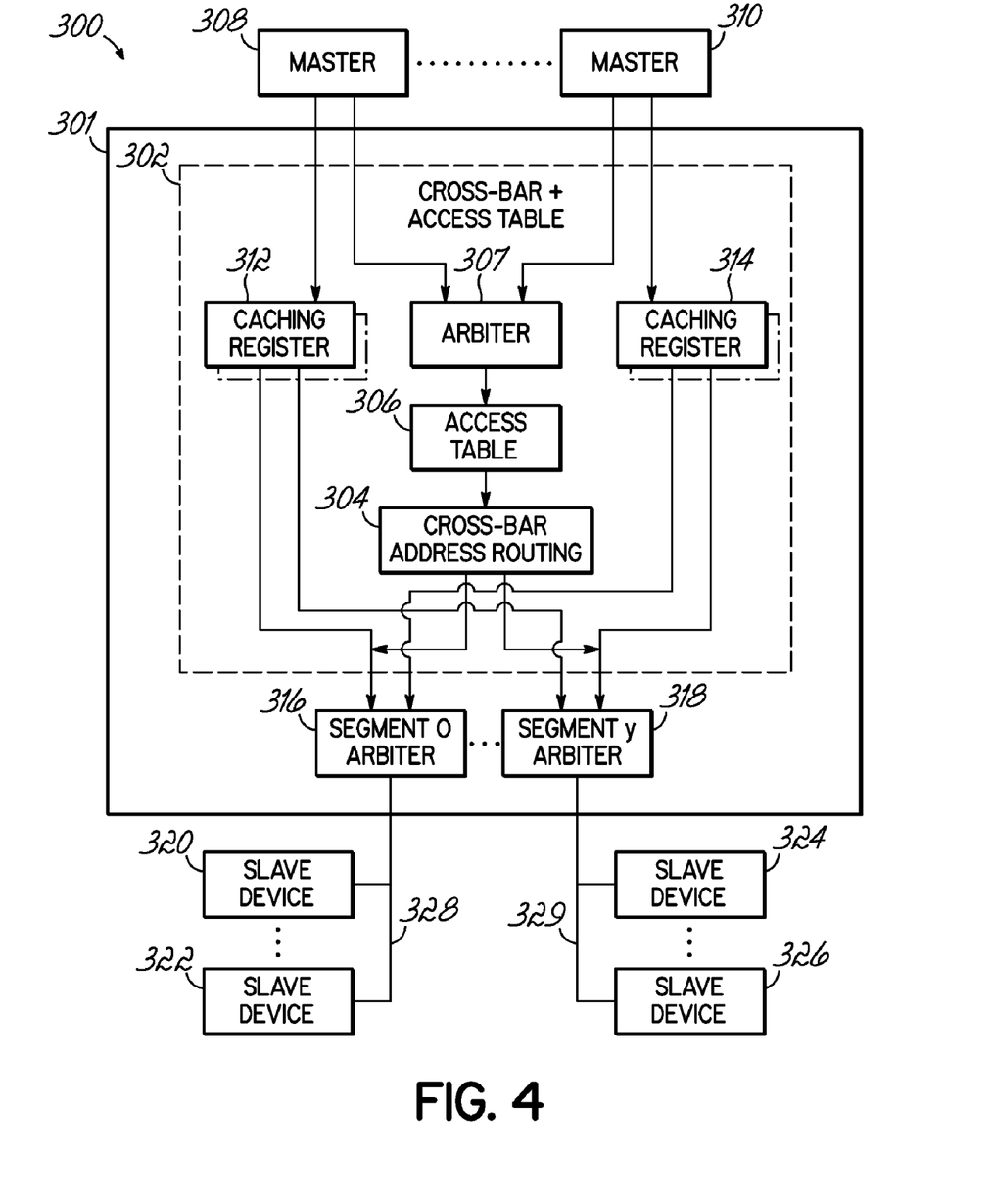
FIG. 4 shows a block diagram of a bridge implementation comprising a combined cross-bar and access table unit and caching register in accordance with the underlying principles of the invention.

FIG. 4 shows selective components of an SOC 300 that include a secure bridge 301 having a combination cross-bar and access table unit 302. The bridge 301 may be positioned and in communication with masters 308, 310 and slave devices 320, 322, 324, 326. The bridge 301 may include arbiters 316, 318.

The combination cross-bar and access table unit 302 includes a cross-bar address routing unit 304 and an access table 306. The combination cross-bar and access table unit 302 may additionally include an arbiter 307. An arbiter 307 may comprise an electronic device that allocates access to shared resources. Arbiters may select the order of access to the shared resource from among concurrent requests. As such, the arbiter 307 may prevent two operations from occurring at once.

As shown in FIG. 4, the combination cross-bar and access table unit 302 may additionally include caching registers 312, 314. One or more such caching registers 312, 314 may respectively communicate with a master 308, 310 through a master port of the bridge 301.

The caching registers 312, 314 may include rapidly accessible memory storage, and may supplant or augment the operation of the access table 306. The caching register 312, 314 may comprise a temporary storage area where frequently accessed data may be stored for rapid access. Once the data is stored in the caching register 312, 314, future use may be made by accessing the cached copy rather than by re-fetching or re-computing the original data, so that the average access time is shorter. Caching thus helps expedite data access. Such data may include addresses.

In one embodiment, the upper address bits of a real address for a request may be compared to one or more caching registers, each containing a tag. A tag may include information that matches contents of a caching register to a data request and may include an address. For each caching register, additional information or attributes may be listed. Such additional information may include a possible substitute address, whether remapping to the substitute address is allowed, the size of the memory region associated with the tag, and whether the overall entry may be considered valid. In addition, a given register entry may include read or write authority based on a master identifier number. Additionally, a given register entry may point to a separate parameter table entry (parameter table is not shown) that includes information relating to security functions, such as encryption and description mechanisms. The parameter table and other associated security functions are not described further as they do not relate directly to aspects of the invention. A segment identifier may also be included in the caching register. The segment identifier may be used for routing the request to the slave segments. Using this mechanism, a given request may be compared against upper addresses based on memory region size, master identifiers, and read or write authority indicators based on a master identification number to arrive at an access level for the request. Further, the request may be associated with a set of access parameters depending upon the results of the comparisons.

The request as routed through the caching registers 312, 314 may connect directly to the arbiters 316, 318 without requiring routing through the access table 306 or cross-bar address routing 304. In that sense, the caching registers 312, 314 provides a direct path to the arbiter 316, 318, and ultimately, the slave devices 320, 322, 324, 326.

The dashed area 302 in FIG. 4 denotes substitution of the enhanced combination cross-bar and table unit 302 for the cross-bar address routing function 218 in FIG. 2. This feature may eliminate the prior art requirement of repeating cross-bar routing.

In order to minimize any cycle time impact on the cross-bar, the access table lookup function should not exceed the timing delay of the cross-bar address routing function that it replaces. Doing a full lookup of the access table 306 will likely exceed the lookup time of the cross-bar address routing function. The caching registers 312, 314 reduce or eliminate this impact. Caching registers 312, 314 may be associated with particular masters 308, 310, either statically or dynamically.

A caching register 312, 314 captures access table information of the most recent access by a particular master 308, 310. The contents of this register 312, 314 may be managed by new control logic that is part of the access table function 306. The contents may also be managed partially or fully managed by software. The register 312, 314 may be loaded with a new value when the control logic selects its contents for replacement. This selection may occur if no matching caching register is found for a master request. A full access table lookup occurs when no matching caching register is found. A matching access table entry, if found, is then loaded into a selected caching register 312, 314.

A master port is likely to access the same region defined by an access table entry repeatedly over a certain time interval. As such, a high hit rate is likely to occur, i.e., a caching register 312, 314 matches on the full address. It is possible, however, that there are certain masters, such as a multi-channel direct memory access (DMA) controller, that have multiple simultaneous streams of master request activity to different regions. If such masters exist in a system, it may be prudent to allocate more than one caching register 312, 314 for this type of master.

The number of caching registers allocated per each master port may be determined in a number of ways. For instance, the number may be statically configured in the register transfer level (RTL) to allow it to be tuned for a particular SOC implementation. Embodiments may commit a specific number of caching registers per master port in a given microchip design. The number may alternatively be dynamically configured from a collection of caching registers. Software may configure a specific number of caching registers per master port at hardware initialization time. Hardware may alternatively configure the number of caching registers 312, 314 per master port in a dynamic fashion during normal operation based upon the selected allocation policy.

Determining which of the above allocation schemes to implement for a given design point may involve assessing applicable trade-offs between design flexibility, complexity, area and timing. For instance, a most simple configuration may have a single caching register statically allocated to each master.

An additional master ID field may be added to the caching registers for the dynamic allocation scheme to allow assigning of registers to particular masters. This field may be used as part of the functions that match incoming master requests to caching registers.

The matching function used for routing a master request to a segment arbiter does not have to be the same as the matching function used to validate the access. The matching function for routing may use a simpler mechanism, e.g., a subset of address bits. Full address match and permissions validation may occur in parallel and be used later to block sending an arbitrated request to slave devices. In this case, hardware or software may have to manage the caching register entries to ensure proper operation, e.g. each entry generates a unique match for routing.

Segment identification information may also be added to a caching register when the register is updated with the access table contents after a caching register miss (i.e., no caching register fully matches the incoming request). When a master request comes in on a particular port, the segment ID from the appropriate caching register may be used to route the request to the appropriate segment arbiter. If only a single statically configured caching register exists on the master port, then the segment ID from that register may be used for routing. If multiple or dynamically allocated caching registers exist on the master port, then one of the segment IDs may be selected using the matching function for routing.

Assuming a hit, or address match, the remap address may come directly out of the matching caching register. This address may no longer be used for cross-bar routing, but may be forwarded directly to the slaves when the request is selected by the segment arbiter.

Figure 5:
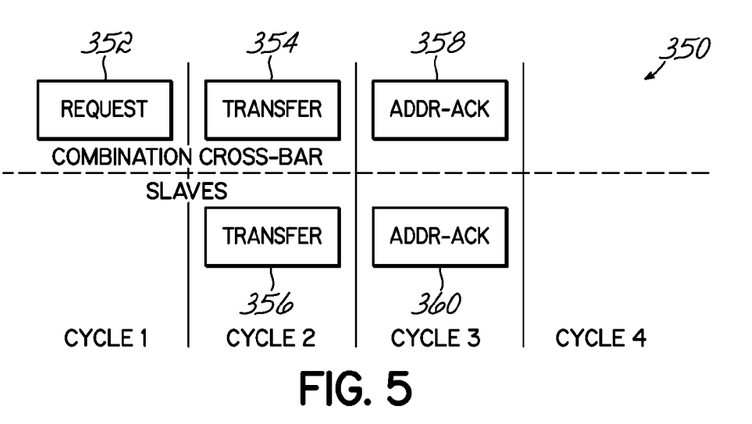
FIG. 5 shows a timing diagram for the bridge implementation of FIG. 4 in which a caching register hit occurs.

FIG. 5 is a timing diagram 350 showing data request communications over a period of cycles as viewed by components of the SOC 300 of FIG. 4 in accordance with the underlying principals of the present invention. The timing sequence 350 more particularly shows data request communications taken from the perspective of the combination cross-bar and access table 302 and slave devices 320, 322, 324, 326.

Concurrent with the request 352 during cycle 1, a caching register 312 may accomplish a lookup and route the request 352 using a segment identifier from the caching register 312. Also during cycle 1, the request may win cross bar arbitration by arbiter 316 or 318, depending upon routing.

Both the combination cross-bar and access table unit 302 and applicable slave device 320 may respectively view a request transfer 354, 356 during cycle 2. Acknowledgements 358, 360 may be accomplished during cycle 3. Of note, the operation has been accomplished during cycle 3 and includes no required processes in cycle 4.

FIG. 5 shows a master request that matches on an associated caching register entry and wins arbitration for the slave segment 328. When contrasted with FIG. 3, the diagram 350 of FIG. 5 shows how embodiments may eliminate a cycle associated with passing a master request to the slaves when a caching register hit occurs.

If no match occurs on a caching register 312, 314, then the segment arbitration results should be blocked from propagating to the slave devices 320, 322, 324, 326. Likewise, updates to the arbiters' state information should be blocked.

A caching register miss may result in a full access table lookup to determine if there is a valid entry in the access table 306 for the master 308 being requested. The full access table lookup may also occur in parallel with caching register matching if this request is the only request needing a lookup in the access table 306. If two or more requests are trying to get into the access table 306 simultaneously, then arbitration may result to control entry into the access table 306. Namely, arbiter 307 may be used to control entry into the access table 306. This arbiter 307 may be designed, for example, to accept a new request into the access table 306 on every clock cycle.

Where so configured, the access table 306 may implement more than one request port, in which case the arbiter 307 may select n pending requests, if there are n ports into the access table. The number of ports on the access table 306 may be optimized as a function of the frequency of multiple pending master requests, the resulting performance effect of adding additional ports, and the additional logic required to implement them. The number of ports into the access table may not be directly related to the number of master request ports.

Once a request with caching register miss gains entry into the access table 306, and assuming an access table hit, then a valid remap address may be assigned to the request. The request may then go through cross-bar address routing and the appropriate segment arbitration. A caching register may be updated to reflect the selected access table entry and segment ID. The segment ID may be an output of the cross-bar address routing function 304. If there are multiple caching registers 312 associated with the requesting master 308 that resulted in no match, then a caching register 312 may be chosen for updating using standard selection schemes, such as least recently used (LRU) selection processes.

Figure 6:
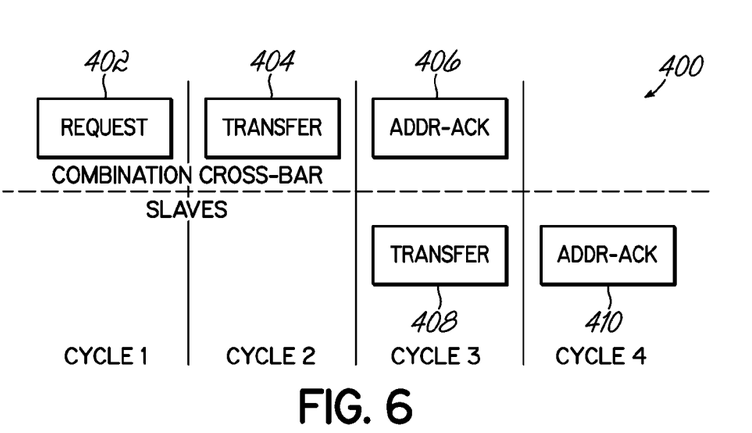
FIG. 6 shows a timing diagram for the bridge implementation of FIG. 4 in which a caching register miss occurs.

FIG. 6 shows a timing diagram 400 for the components of the SOC 300 of FIG. 4 that may occur in the event of a caching register miss. As with the caching register hit scenario of FIG. 5, the timing diagram 400 shown in FIG. 6 is taken from the perspective of both the combination cross-bar and access table 302 and one of the slave devices 320, 322, 324, 326.

The processes of the diagram 400 presume that the access table port is available and that arbitration is won for the master 308 that gets the miss. The remap address may become available at the end of the request cycle, and may be used in the following cycle to determine the appropriate segment to route the request. A one cycle penalty may be incurred in this case. Additional penalty cycles may occur if a port on the access table is not immediately available.

Turning more particularly to the timing diagram 400, the request 402, as seen by the combination cross-bar and access table 302 during cycle 1, may coincide with a miss at the caching register 312. The combination cross-bar and access table 302 may use the arbiter 307 and the access table 306 to accomplish a lookup.

Cycle 2 may include a transfer 404 where cross-bar address routing is accomplished based on a remap address from the access table 306.

Cycle 3 may include an acknowledgement 406 and a transfer 408 viewed by the applicable slave device 320. Cycle 4 may include an acknowledgement 410.

Figure 7:
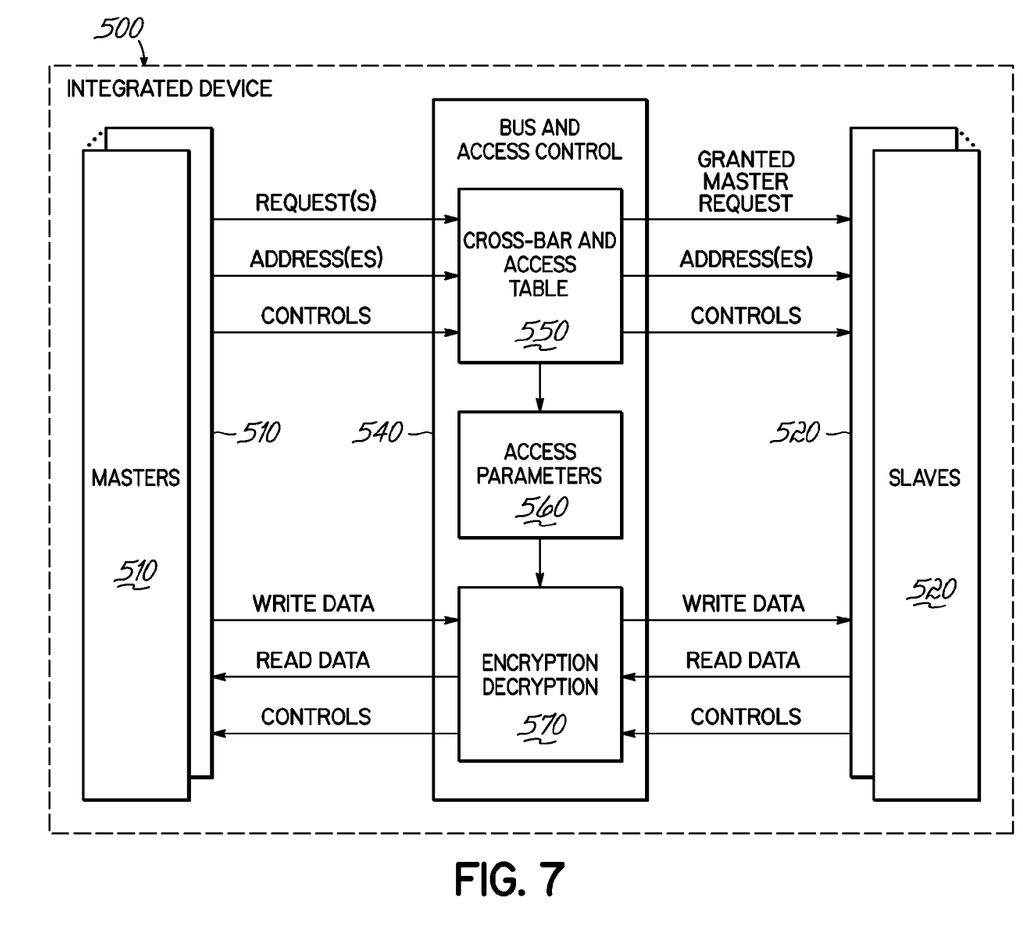
FIG. 7 shows a block diagram of an SOC including a bridge implementation comprising a combined cross-bar and access table unit and caching register in accordance with the underlying principles of the invention.

FIG. 7 shows an SOC 500 that includes a cross-bar and access table unit 550 in accordance with the underlying principles of the present invention. The exemplary SOC 500 may include many of the same or similar components as shown generally in the SOC 100 of FIG. 1. FIG. 7 more particularly depicts an SOC 500 having multiple internal functional masters 510. Masters may comprise processors, typically including a processor core and a memory management unit (not shown). Masters 510 connect in this example to a bus and access control unit 540 of a shared bus. Only one slave segment is shown in FIG. 7, but the cross-bar function implies the existence of multiple segments.

The cross-bar and access table unit 550 intercedes in the data request path between the bus and access control unit 540 and a number of slaves 520. The routing used as previously described for a data request is also used for the data associated with the request. A simplified view of the signals of the bus control architecture is also shown.

In one implementation, a request from a master 510 is sent to the bus and access control/bridge 540, along with the requested address and associated controls (read or write, etc.). The cross-bar and access table unit 550 is used to compare the requested address, master ID, and read or write indicator to a definition of allowed access capability for that master 510. The given request may either be blocked (terminated), allowed in the clear, or allowed with encryption/decryption 570.

If the requested transfer is allowable, then the bus signals are propagated to the slaves 520. Access parameters 560 associated with the request based on the cross-bar and access table unit 550 may be sent to an encryption/decryption engine 570, i.e., if encryption/decryption is applicable. The encryption/decryption engine 570 may be used to encrypt/write data as the data is transferred to a given slave, or decrypt/read data as the data is returned from a given slave 520 using the associated access parameters 560.

Bus and access control unit 540 may facilitate coordinating and consolidating requests to slaves 520 in the SOC system 500. For example, a first slave 520 may comprise an external bus controller that is connected to an external non-volatile memory (not shown), such as flash memory. Another slave 520 may comprise a memory controller that connects to external volatile memory (not shown), such as DRAM.

In general, functions share a common memory pool in an SOC design in order to minimize memory costs and to facilitate the transfer of data between functions. As such, all internal masters 510 may have equal access to both non-volatile and volatile memory, and both storage spaces are labeled open, meaning that there are no limits on data access. Typically, non-volatile memory is used for persistent storage, wherein data should be retained even when power is removed. This memory may contain the boot code, operating code, such as the operating system and drivers, and any persistent data structures. Volatile memory is used for session oriented storage, and generally contains application data as well as data structures of other masters. Since volatile memory is faster than non-volatile memory. It is common to move operating code to volatile memory and execute instructions from there when the integrated device is operational.

The masters 504, 506 within the SOC 500 may each have a unique master identifier that comprises part of the request signal that is routed to the bus and access control unit 540. When multiple requests are presented, the bus and access control unit 540 may select the appropriate master 510 (based on bus priority) and send an acknowledgment back to that master 510.

Boot code (or initialization code) may configure the bridge 540, including the cross-bar and access table unit 550 and any associated access levels that specify the allowed transactions based on master ID and address range, as well as the access parameters to define how a request is to be processed. Prior to passing control to a next level of software, the boot code may lock the access table so that access security levels identified therein cannot be subsequently modified.

Figure 8:
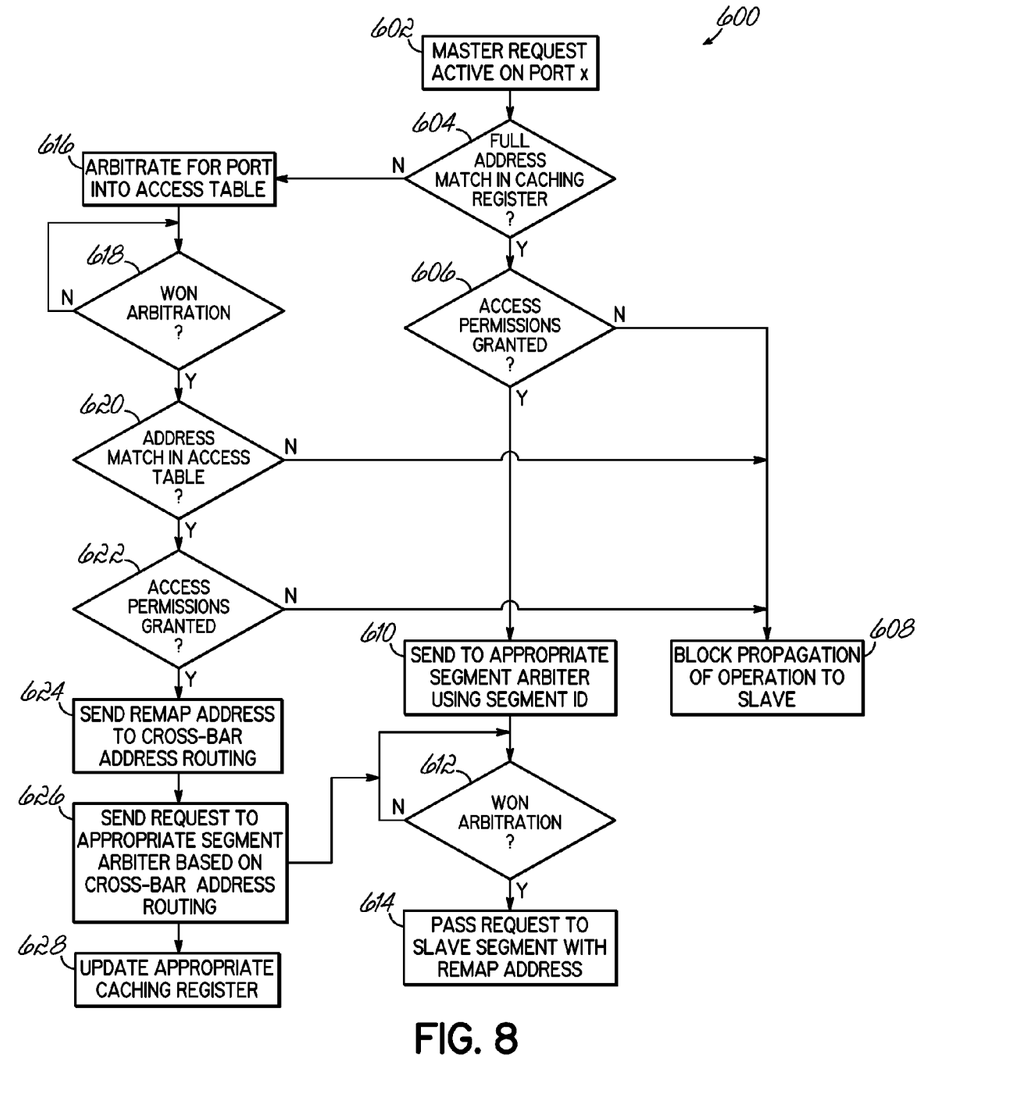
FIG. 8 shows a flowchart for determining access rights, remap address and slave segment using caching registers in accordance with the underlying principles of the invention.

FIG. 8 shows a flowchart 600 that includes steps relating to how a master request may be processed using the combination cross-bar and access table 302 in accordance with the underlying principals of the present invention. The steps of the flowchart 600 more particularly deal with how the master request is handled in terms of the caching registers 312, 314 and the access table 306.

Turning more particularly to the steps of the flowchart 600, a request from master 308 may be active at block 602 on a port of the bridge 301. At block 604, the combination cross-bar and access table 302 may determine if an address match may be made in the caching register 312. Where a match may be determined at block 604, the SOC 300 may determine at block 606 if access permissions should be granted. If not, then the SOC 300 may block propagation of the operation to the slave segment 328 or 329 at block 608.

Where access permissions are alternatively granted at block 606, the SOC 300 may send at block 610 the data request to the appropriate segment arbiter 316, 318 using the segment identifier from the caching register 312. Where arbitration is won at block 612, the arbiter 316 or 318 may pass the request to the slave segment 328 or 329, and the segment may be sent with the remap address at block 614.

Where an address match cannot be found in the applicable caching register 312, the arbiter 307 may be used at block 616 to arbitrate for access into the table 306. Where arbitration is won at block 618, the access table 306 may determine at block 620 if a match may be found. Where no match is found, propagation of the operation may be altered at block 608.

Where an address match is alternatively found at block 620, the SOC 300 may determine at block 622 if access permissions should be granted. Where no access permissions are granted, propagation of the operation to the slave segment 328 or 329 may be stopped at block 608. Where access permissions are alternatively granted at block 622, then the remap address may be sent to cross-bar routing 304 at block 624.

The request may be sent at block 626 to the arbiter 316 or 318. The appropriate caching register 312 may be updated at block 628. When arbitration is won at block 612, the arbiter 318 or 319 may pass the request with remap address to slave segment 328 or 329 at block 614.

As such, FIG. 8 provides a flowchart representation of how a master request is processed using the caching registers 312, 314 and the access table 306 of the combined cross-bar and access table unit 302. Certain processes of the flowchart 600 shown as occurring in a logically sequential manner may alternatively be accomplished in parallel as previously described. For example, a master request may be sent to a segment arbiter prior to full address match and permission validation.

Embodiments of the present invention may be included in an article of manufacture (e.g., one or more computer program products) having, for instance, computer usable media. The media has embodied therein, for instance, computer readable program code means for providing and facilitating the capabilities of the present invention. The article of manufacture may be included as a part of a computer system or sold separately.

Aspects consistent with the invention may be implemented within a single computer or other programmable electronic device, such as a desktop computer, a laptop computer, a handheld computer, a cell phone, a set top box, a non-networked, standalone configuration, etc.

In general, the routines executed to implement the embodiments of the invention, whether implemented as part of an operating system or a specific application, component, program, object, module or sequence of instructions, or even a subset thereof, will be referred to herein as "algorithms," "program code," or simply "programs." Program code typically comprises one or more instructions that are resident at various times in various memory and storage devices in a computer; when read and executed by one or more processors in a computer they cause that computer to perform the steps necessary to execute steps or elements embodying the various aspects of the invention.

Moreover, while the invention has and hereinafter will be described in the context of SOCs and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media comprise, but are not limited to tangible, recordable type media and transmission type media. Examples of tangible, recordable type media include volatile and non-volatile memory devices, floppy and other removable disks, hard disk drives, magnetic tape, and optical disks (CD-ROMs, DVDs, etc.). Examples of transmission type media include digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the present invention has been illustrated by a description of various embodiments and while these embodiments have been described in considerable detail, it is not the intention of the Applicants to restrict, or, in any way limit the scope of the appended claims to such detail. For instance, an embodiment may include a caching register in the bridge to reduce the number of ports into the access table and to reduce timing constraints without moving the access table function to the cross-bar. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A method of routing a data request within a system-on-a-chip design, the method comprising:
determining whether to allocate a cache register to one of a first master component and a second master component, wherein the cache register is communicatively coupled to the first master component and to the second master component, and wherein the cache register is operable to receive data requests from the first master component and from the second master component;
allocating the cache register to the first master component, wherein, upon allocation of the cache register to the first master component, the cache register is operable to route a data request that is received from the first master component and is not operable to route data requests that are received from the second master component;
receiving the data request from the first master component at the cache register, wherein the cache register includes a plurality of entries;
matching the data request to a first entry of the plurality of entries in the cache register, wherein the first entry includes first routing information; and
routing the data request from the cache register to one of a first slave segment component and a second slave segment component based at least in art on the first routine, information.

2. The method of claim 1, wherein the data request includes an address, and wherein the cache register matches the data request to the first entry based at least in part on the address.

3. The method of claim 2, further comprising, in response to matching the data request to the first entry, remapping a portion of the address of the data request at the cache register.

4. The method of claim 3, wherein the first routing information includes a segment identifier, wherein the address of the data request is remapped based on the segment identifier.

5. The method of claim 1, further comprising updating the plurality of entries in the cache register with an update entry provided by an access table.

6. The method of claim 5, further comprising, concurrently with matching the data request to the first entry in the cache register, performing a full access table lookup on the access table, wherein the access table includes a second plurality of entries, wherein each entry of the second plurality of entries includes routing information.

7. The method of claim 1, further comprising allocating a second cache register to the first master component, wherein, upon the allocation of the second cache register, the second cache register is operable to route data requests that are received from the first master component and is not operable to route data requests that are received from the second master component.

8. The method of claim 1, further comprising validating permissions associated with the data request prior to routing the data request.

9. The method of claim 1, wherein the determination of whether to allocate the cache register is based on an allocation policy.

10. An apparatus comprising:
a first master component and a second master component, wherein the first master component and the second master component are operable to generate data requests;
a cache register communicatively coupled to the first master component and to the second master component, wherein the cache register includes a plurality of entries, and wherein the cache register is operable to route data requests that are received from the first master component and is not operable to route data requests that are received from the second master component in response to an allocation of the cache register to the first master component;
a first slave segment component communicatively coupled to the cache register; and
a second slave segment component communicatively coupled to the cache register, wherein the cache register is operable to route a data request associated with the first master component to one of the first slave segment component and the second slave segment component based at least in part on first routing information.

11. The apparatus of claim 10, further comprising a second cache register communicatively coupled to the first master component and the second master component, wherein the second cache register is operable to route data requests that are received from the first master component and to not route data requests that are received from the second master component based on an allocation of the second cache register to the first master component.

12. The apparatus of claim 11, wherein the second cache register is dynamically allocated to the first master component.

13. The apparatus of claim 11, wherein allocation of the second cache register is based on a master type associated with the first master component.

14. The apparatus of claim 10, wherein allocation of the cache register is based on a predetermined number of cache registers allocated to the first master component.

15. The apparatus of claim 10, further comprising an access table communicatively coupled to the first master component and the second master component; wherein the access table is operable to route data requests that are received from the first master component and to route data requests that are received from the second master component.

16. The apparatus of claim 15, wherein the data request is concurrently processed by the cache register and processed by the access table.

17. The apparatus of claim 10, wherein the cache register is allocated by hardware associated with the cache register.

18. The apparatus of claim 10, wherein the cache register remaps an address associated with the data request prior to routing the data request to one of the first slave segment component and the second slave segment component.

19. A non-transitory computer-readable medium storing computer-executable instructions that, when executed by a processor, cause the program product, comprising processor to:
determine whether to allocate a cache register to one of a first master component and a second master component, wherein the cache register is communicatively coupled to the first master component and to the second master component, and wherein the cache register is operable to receive data requests from the first master component and from the second master component;
allocate the cache register to the first master component, wherein, upon allocation of the cache register to the first master component, the cache register is operable to route a data request that is received from the first master component and is not operable to route data requests that are received from the second master component;
receive the data request from the first master component at the cache register, wherein the cache register includes a plurality of entries;
match the data request to a first entry in the cache register, wherein the first entry includes first routing information; and
route the data request from the cache register to one of a first slave segment component and a second slave segment component based at least in part on the first routing information.

20. The non-transitory computer-readable medium of claim 19, further comprising computer-executable instructions that, when executed by the processor, cause the processor to manage the plurality of entries of the cache register.

* * * * *